(12) United States Patent
Windell et al.

(10) Patent No.: US 8,677,043 B2
(45) Date of Patent: Mar. 18, 2014

(54) FILLER MODULE FOR COMPUTING DEVICES

(75) Inventors: David T. Windell, Research Triangle Park, NC (US); Jeffrey J. Smith, Research Triangle Park, NC (US); Timothy A. Meserth, Research Triangle Park, NC (US); Seth D. Lewis, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 417 days.

(21) Appl. No.: 12/945,359

(22) Filed: Nov. 12, 2010

(65) Prior Publication Data
US 2012/0120588 A1 May 17, 2012

(51) Int. Cl.
*H05K 7/10* (2006.01)
*G06F 13/40* (2006.01)

(52) U.S. Cl.
CPC .................................. *G06F 13/409* (2013.01)
USPC ............................................. 710/301; 710/62

(58) Field of Classification Search
USPC ........... 710/300–306, 313–317, 62–64, 8–19, 710/72–74
See application file for complete search history.

(56) References Cited

U.S. PATENT DOCUMENTS

| | | | |
|---|---|---|---|
| 5,842,880 A * | 12/1998 | Pei ................................ | 439/327 |
| 6,219,233 B1 | 4/2001 | Moore et al. | |
| 6,879,485 B2 | 4/2005 | Nakagawa et al. | |
| 7,433,983 B2 * | 10/2008 | Lu ................................. | 710/104 |
| 7,600,112 B2 * | 10/2009 | Khatri et al. ................... | 713/100 |
| 7,698,488 B2 * | 4/2010 | Lu ................................. | 710/301 |
| 7,788,421 B1 | 8/2010 | Heath | |
| 8,055,829 B2 * | 11/2011 | Chen et al. ..................... | 710/301 |
| 8,116,078 B2 * | 2/2012 | Xu et al. ......................... | 361/695 |
| 8,131,903 B2 * | 3/2012 | Pearson et al. ................ | 710/301 |
| 2004/0165358 A1 | 8/2004 | Regimbal | |
| 2007/0094425 A1 * | 4/2007 | Chang ............................ | 710/69 |
| 2007/0101037 A1 * | 5/2007 | Lin et al. ....................... | 710/301 |
| 2007/0211430 A1 | 9/2007 | Bechtolsheim | |
| 2008/0244147 A1 * | 10/2008 | Chen ............................. | 710/313 |
| 2009/0027852 A1 | 1/2009 | Roesner | |
| 2009/0055567 A1 * | 2/2009 | Chen et al. ..................... | 710/302 |
| 2009/0063741 A1 * | 3/2009 | Lu .................................. | 710/301 |
| 2009/0284928 A1 * | 11/2009 | Eckberg et al. ............... | 361/707 |

OTHER PUBLICATIONS

System Identifiable Memory DIMM Filler, IP.com Number, IPCOM000191609D, Jan 8, 2010 UTC.

* cited by examiner

*Primary Examiner* — Raymond Phan
(74) *Attorney, Agent, or Firm* — Suiter Swantz pc llo

(57) ABSTRACT

An A filler module may include, but is not limited to: a body portion; and at least one conductive portion receivable within a component port of a computing device.

A method for initializing a computing system may include but is not limited to: detecting a presence or absence of one or more filler modules within one or more computing device component ports; and determining compliance with an allowed filler module configuration according to the detection of the presence or absence of the one or more filler modules withing the one or more computing device component ports.

A system comprising: a computing device component port; and a processing device configured to: detect a presence or absence of one or more filler modules within one or more computing device component ports, and determine compliance with an allowed filler module configuration according to the detection of the presence or absence of the one or more filler modules within the one or more computing device component ports.

17 Claims, 3 Drawing Sheets

FILLER MODULE FOR COMPUTING DEVICES

BACKGROUND

In server systems, proper cooling and airflow are becoming are necessary. With increasingly dense system boards and higher-powered processors, airflow design is a science that requires precision engineering and novel solutions in order to maximize system performance.

SUMMARY

A filler module may include, but is not limited to: a body portion; and at least one conductive portion receivable within a component port of a computing device.

A method for initializing a computing system may include but is not limited to: detecting a presence or absence of one or more filler modules within one or more computing device component ports; and determining compliance with an allowed filler module configuration according to the detection of the presence or absence of the one or more filler modules withing the one or more computing device component ports.

A system comprising: a computing device component port; and a processing device configured for: detecting a presence or absence of one or more filler modules within one or more computing device component ports, and determining compliance with an allowed filler module configuration according to the detection of the presence or absence of the one or more filler modules withing the one or more computing device component ports.

BRIEF DESCRIPTION OF THE DRAWINGS

Figure Number.

DETAILED DESCRIPTION

Figure 1:
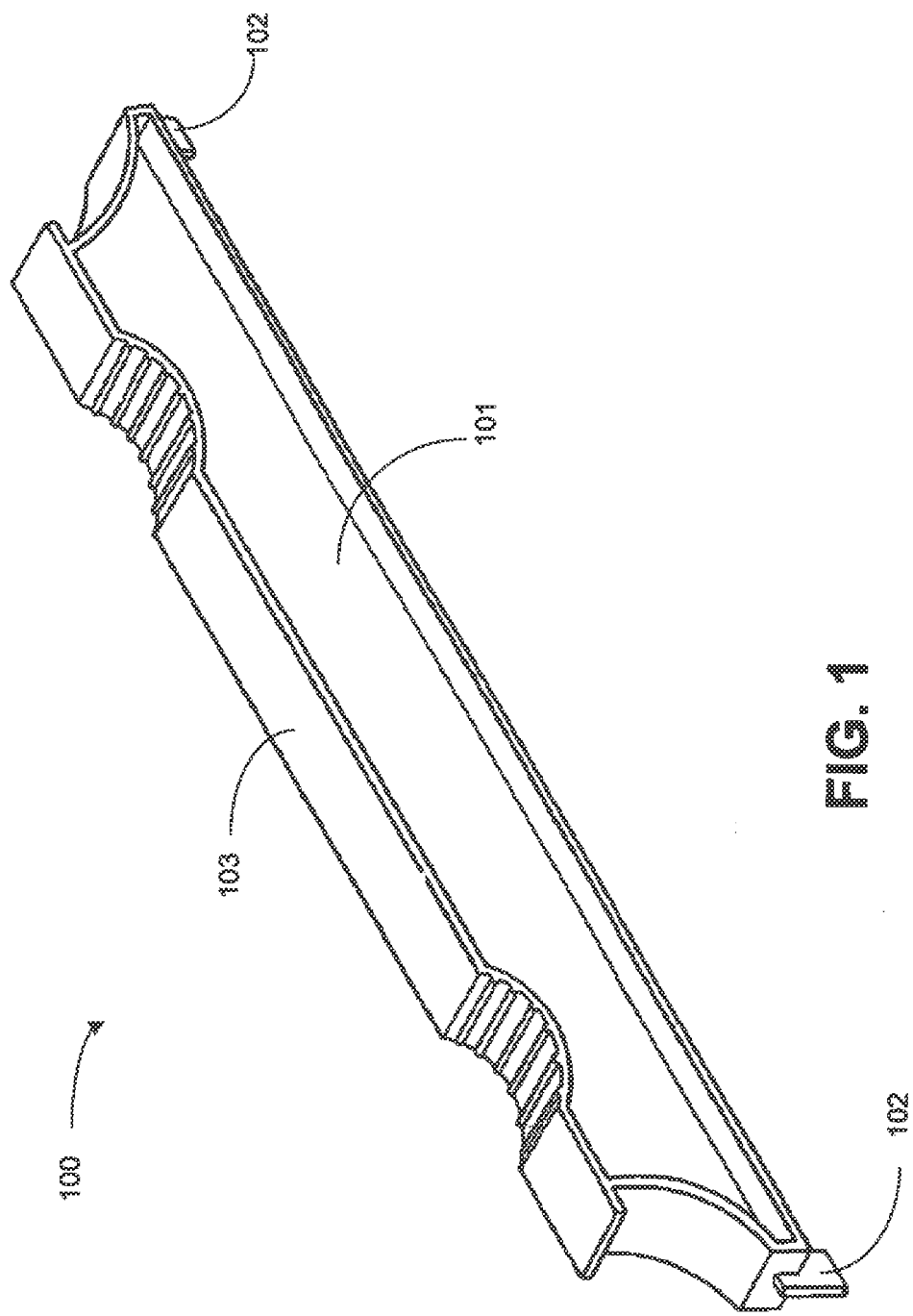
FIG. 1 shows a filler module.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

In order to optimize airflow and ensure that air channels are appropriately routed to the hottest components of computing systems, fillers or air baffles (dampeners) may be used in place of components when optional parts are not installed. For example, such fillers may be used in place of dual in-line memory modules (DIMMs), PCI cards, hard drives, processors, expansion cards, or any other optional system component. These fillers may include simple plastic parts that mimic the shape of various system components and ensure that the integrety of thermal properties for adjacent components (e.g. processors) are maintained.

When such fillers are not installed in machines and the airflow properties that the device is designed for are not met, consequences can be severe. In best-case scenarios, components such as processors can overheat and cause systems to shut down, increasing system downtime and costing valuable compute cycles. In more severe situations, permenant system board or processor damage can occur.

Referring to FIG. 1, an inactive DIMM filler module 100 is shown. A body portion 101 of the DIMM filler module 100 may be constructed of any number of low-cost materials (e.g. plastics). The DIMM filler module 100 may include one or more conductive tab portions 102. For example, the conductive tab portions 102 may include small metallic contacts (e.g. copper) which are coupled to body portion 101 of the DIMM filler module 100. Alternately, the body portion 101, itself may be constructed a conductive material. For example, the body portion 101 may be constructed from CoolPoly® E2 Thermally Conductive Liquid Crystalline Polymer (LCP) marketed by Cool Polymers®, Inc.

The DIMM filler module 100 may include one or more airflow guides (e.g. surface 103) which may be specifically configured to direct airflow within a computing device in a manner that optimizes cooling of active components within the computing device. A DIMM filler module 100 need not meet the format/fit requirements of a DIMM other than the inclusion of a limited number (e.g. one) of conductive tab portions 102 that must be receiveable by a DIMM slot 104, as will be described below. As such, use of DIMM filler modules 100 may present an advantage over the use of depopulated DIMMs as fillers in terms of both cost and cooling profile.

Figure 2:
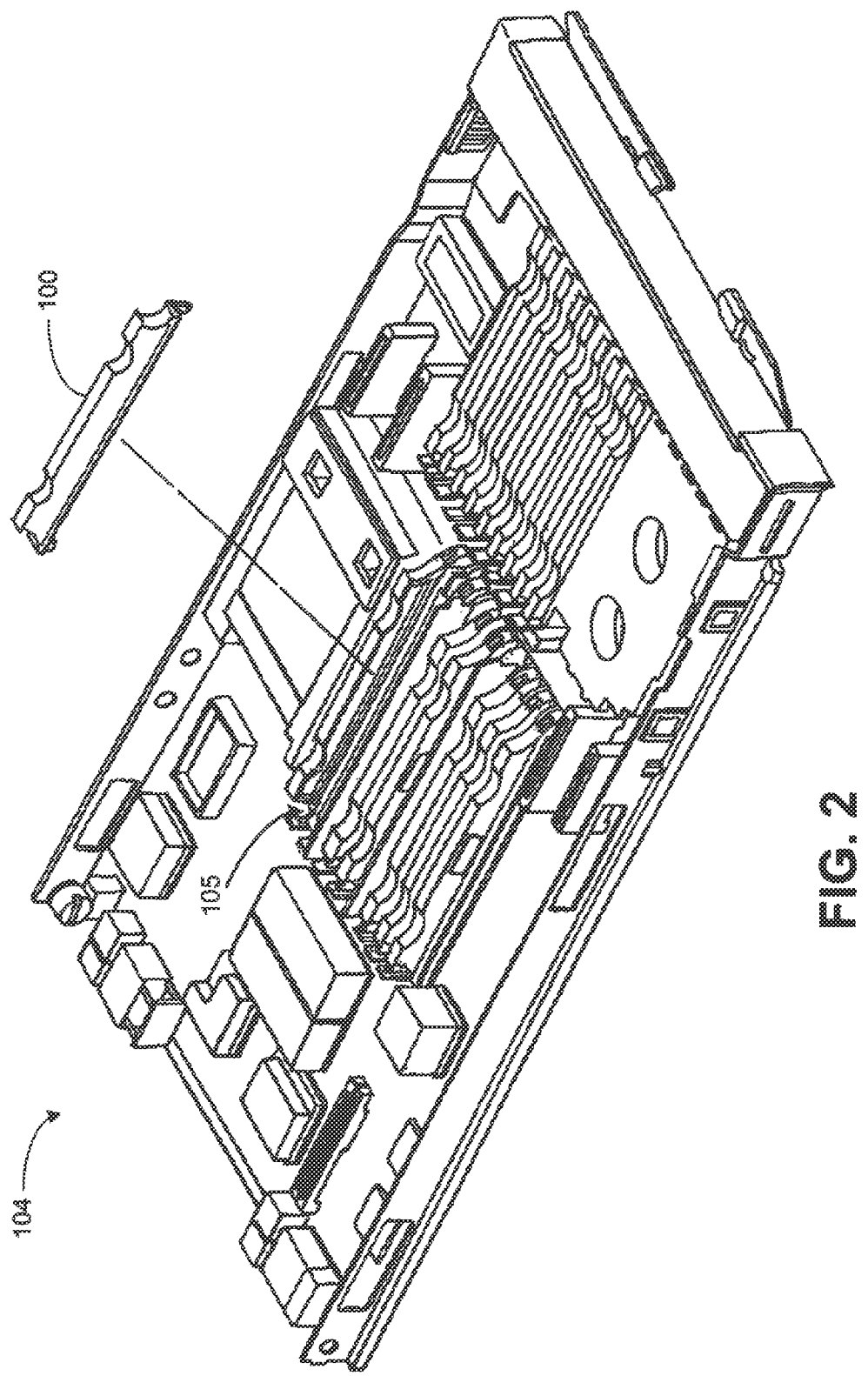
FIG. 2 shows a filler module disposed within a server node.

Referring to FIG. 2, a server node 104 may include one or more DIMM slots 105 configured to receive one or more DIMMs (not shown). Where one or more DIMMS are not required for operation of the server node 104, one or more DIMM filler modules 100 including at least one of conductive tab portions 102 and/or a conductive body portion 101 may be inserted into one or more DIMM slots 105 in place of one or more DIMMs in order to maintain the airflow characteristics within the server node 104.

When a DIMM filler module 100 including at least one of conductive tab portions 102 and or a conductive body portion 101 is to be disposed within a DIMM slot 104, at least one of the conductive tab portions 102 or conductive body portion 101 may physically engage one or more contacts of the DIMM slot 104 so as to create an electrically transmissive pathway including the contacts of the DIMM slot 104 and at least one of the conductive tab portions 102 and conductive body portion 101. Such a pathway may allow for the transmission of signals via the DIMM filler module 100 that may be employed to detect a presence of a DIMM filler module 100 within the DIMM slot 104.

Figure 3:
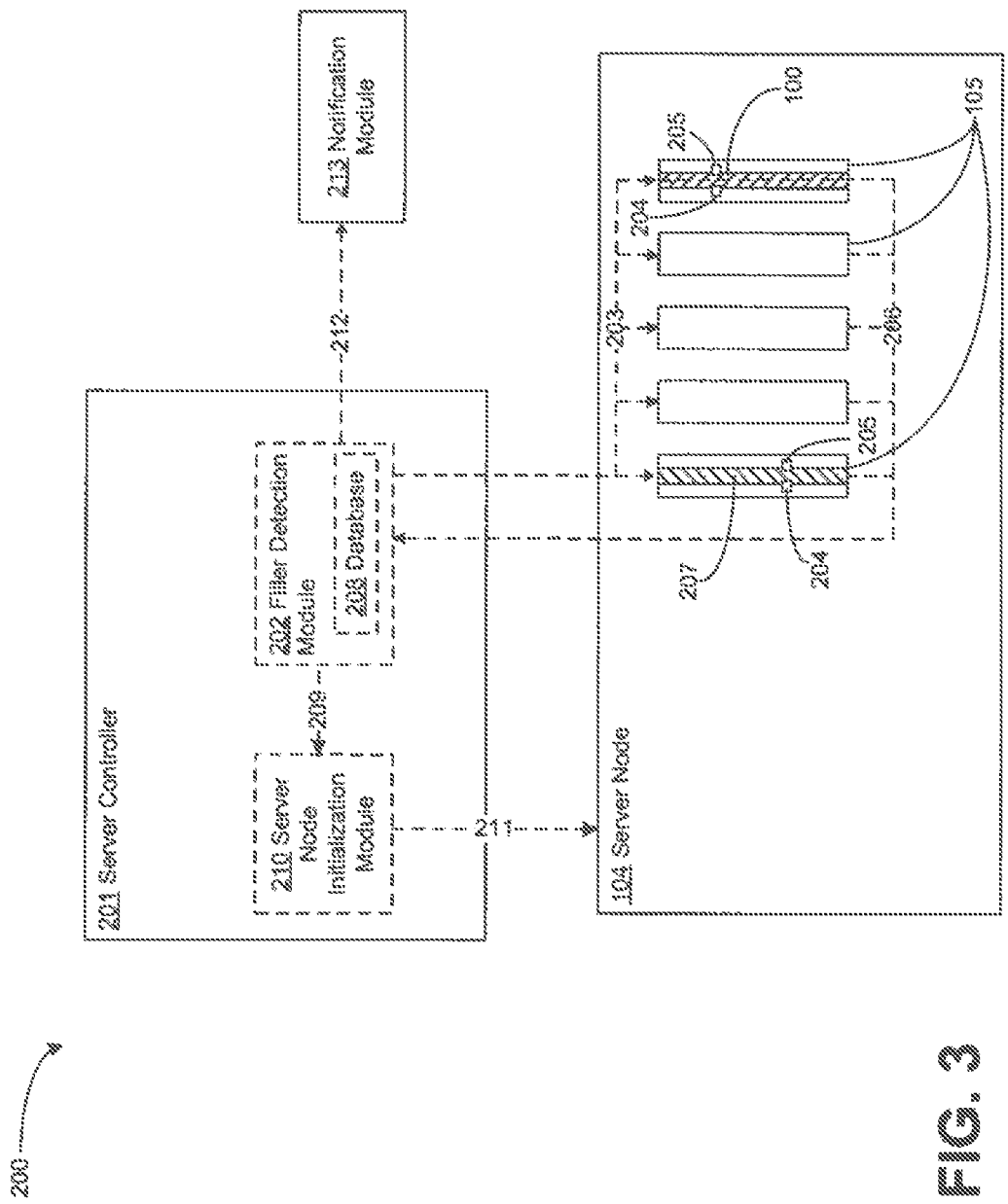
FIG. 3 shows a system for detecting a presence of a filler module within a server node.

Referring to FIG. 3, a system 200 for initializing a computing device (e.g. a server node 104) according to a presence of a filler module (e.g. a DIMM filler module 100) within a component port (e.g. a DIMM slot 104) is presented. The system 200 may include a server controller 201 configured to provide control signals to the server node 104. The server node 104 may include one or more DIMM slots 105 configured to receive one or more DIMM filler modules 100. The server controller 201 may include a filler detection module 202. The detection module 202 may be configured to transmit one or more signals 203 to the DIMM slots 105 in order to determine the presence of a DIMM filler module 100 within a given DIMM slot 104.

Upon insertion of a DIMM filler module 100 within a DIMM slot 104, the conductive tab portions 102 or conductive body portion 101 of the DIMM filler module 100 may provide an electrical connections between a contact 204 of the DIMM slot 104 and a contact 205 of the DIMM slot 104. The signals 203 transmitted by the detection module 202 may be returned to the detection module 202 via signals 206, thereby providing the detection module 202 an indication of the presence of the DIMM filler module 100 within a DIMM slot 104.

Similarly, a DIMM 207 may also be disposed in a DIMM slot 104. The system 200 may detect the presence of the DIMM 207 within the DIMM slot 104 Upon insertion of a DIMM 207 within a DIMM slot 104, a pin of the DIMM 207 may provide an electrical connections between a contact 204 of the DIMM slot 104 and a contact 205 of the DIMM slot 104. The signals 203 transmitted by the detection module 202 may be returned to the detection module 202 via signals 206, thereby providing the detection module 202 an indication of the presence of the DIMM 207 within a DIMM slot 104.

The system 200 may distinguish between a presence of a DIMM filler module 100 and a DIMM 207 according to the DIMM slot 104 contacts which are engaged by either the DIMM filler module 100 or the DIMM 207. For example, a pin of the DIMM 207 may bridge contact 204 and contact 205 at positions 20 and 50 of the DIMM slot 104. Alternately, the conductive tab portions 102 of a DIMM filler module 100 may bridge contact 204 and contact 205 at positions 5 and 15 of the DIMM slot 104.

The detection module 202 may include a database 208 maintaining one or more allowable DIMM filler module 100/DIMM 207 configurations including various required and/or optional configurations of DIMM filler modules 100 and/or DIMMs 207. The detection module 202 may compare the signals 206 representative of the presence or absence of the DIMM filler modules 100 and/or DIMMs 207 to allowable configurations stored in the database 208 to determine compliance of a current configuration of DIMM filler modules 100 and/or DIMMs 207 with an allowable configuration.

Upon a detection of compliance with an allowable DIMM filler module 100/DIMM 207 configuration, the detection module 202 may provide an authorization signal 209 to a server node initialization module 210 (e.g. pre-boot software such as a board management controller or service processor). Upon receipt of the authorization signal 209, the server node initialization module 210 may provide an initialization signal 211 to the server node 104 directing the server node 104 to boot.

Alternately, the detection module 202 may determine that a current configuration of DIMM filler modules 100 and/or DIMMs does not comply with an allowable DIMM filler module 100/DIMM configuration. In such a case, the detection module 202 will not provide the authorization signal 209 to the server node initialization module 210, thereby restricting the boot.

In the case of either a compliant or non-compliant configuration of DIMM filler modules 100 and/or DIMMs, a notification signal 212 may be provided to a notification module 213 (e.g. a display monitor, a blinking LED, a text or e-mail messaging system, and the like) indicative of such compliance or non-compliance. The notification module 213 may alert a user to any problems with a current DIMM filler module 100/DIMM 207 installation.

While the above description has been provided in the context of detection of the presence or absence of DIMM filler modules 100, it will be noted that the above described systems and methods may be employed for detection of the presence or absence of any type of filler module which may be inserted into a computing system in place of an active component. Such filler modules may include, but are not limited to, filler modules for active components such as memory elements, PCI cards/adapters, hard drives (HDD and/or SSD), processors, expansion cards and any other removable components of a computing system.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Although specific dependencies have been identified in the claims, it is to be noted that all possible combinations of the features of the claims are envisaged in the present application, and therefore the claims are to be interpreted to include all possible multiple dependencies. It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A filler module consisting essentially of:
    a body portion; and
    at least one conductive portion receivable within a component port of a computing device,
    wherein the body portion is configured to direct a cooling airflow when the at least one conductive portion is received within a component port of a computing device.

2. The filler module of claim 1, wherein the component port comprises:
    a component port configured to receive at least one of a memory element, a PCI card, a hard drive and a processor.

3. The filler module of claim 1, wherein the body portion comprises is the conductive portion.

4. The filler module of claim 1, wherein the computing device is a server node.

5. The filler module of claim 2, wherein the conductive portion is receivable within a dual in-line memory module port of a computing device.

6. A method comprising:
    detecting a presence or absence of one or more filler modules within one or more computing device component ports; and
    determining compliance with an allowed filler module configuration according to the detection of the presence or absence of the one or more filler modules within the one or more computing device component ports,
    wherein the one or more filler modules consists essentially of:
        a body portion configured to direct a cooling airflow when received in a computing device component port; and
        at least one conductive portion receivable within a component port of the one or more computing device component ports.

7. The method of claim 6, further comprising:
    authorizing an initialization of the computing system upon a determination of a presence of one or more filler modules within the one or more computing device component ports.

8. The method of claim 6, wherein the detecting a presence or absence of one or more filler modules within one or more computing device component ports comprises:

detecting a signal transmitted from the first computing device component port contact to the second computing device component port contact when a conductive portion of a filler module is disposed between the first computing device component port contact and the second computing device component port contact.

9. The method of claim 6, further comprising:
detecting a presence or absence of one or more active components within one or more computing device component ports.

10. The method of claim 6, further comprising:
providing a notification of at least one of compliance or non-compliance with an allowed filler module configuration.

11. The method of claim 9, further comprising:
determining compliance with an allowed active component configuration according to the detection of the presence or absence of the one or more active components within the one or more computing device component ports.

12. The method of claim 9, wherein the detecting a presence or absence of one or more active components within one or more computing device component ports comprises:
detecting a signal transmitted from the first computing device component port contact to the second computing device component port contact when a conductive portion of an active component is disposed between the first computing device component port contact and the second computing device component port contact.

13. A system comprising:
a computing device component port; and
a processing device configured for:
  detecting a presence or absence of one or more filler modules within one or more computing device component ports; and
  determining compliance with an allowed filler module configuration according to the detection of the presence or absence of the one or more filler modules within the one or more computing device component ports,
wherein the one or more filler modules consists essentially of:
  a body portion configured to direct a cooling airflow within the computing device; and
  at least one conductive portion receivable within a component port of the one or more computing device component ports.

14. The system of claim 13, wherein the processing device is further configured for:
authorizing an initialization of the computing system upon a determination of a presence of one or more filler modules within the one or more computing device component ports.

15. The system of claim 13, wherein the processing device is further configured for:
detecting a presence or absence of one or more active components within one or more computing device component ports.

16. The system of claim 13, wherein the processing device is further configured for:
providing a notification of at least one of compliance or non-compliance with an allowed filler module configuration.

17. The system of claim 15, wherein the processing device is further configured for:
determining compliance with an allowed active component configuration according to the detection of the presence or absence of the one or more active components within the one or more computing device component ports.

\* \* \* \* \*